PULSE-CODED, WIDE BAND RADIO COMMUNICATION SYSTEM

Filed Sept. 12, 1966 3 Sheets-Sheet 1

INVENTOR
HENRY MAGNUSKI
BY
Mueller, Aichele & Rauner
ATTYS.

INVENTOR
HENRY MAGNUSKI
BY
Mueller, Aichele & Rauner
ATTYS.

PULSE-CODED, WIDE BAND RADIO COMMUNICATION SYSTEM

INVENTOR
HENRY MAGNUSKI
BY
Mueller, Aichele & Rauner
ATTYS.

3,506,966
Patented Apr. 14, 1970

3,506,966

PULSE CODED, WIDE BAND RADIO COMMUNICATION SYSTEM

Henry Magnuski, Glenview, Ill., assignor to Motorola, Inc., Franklin Park, Ill., a corporation of Illinois Filed Sept. 12, 1966, Ser. No. 578,856
Int. Cl. H04q *1/45, 11/02, 11/04*
U.S. Cl. 340—171 13 Claims

ABSTRACT OF THE DISCLOSURE

Wideband radio communication system in which a plurality of independent communications can co-exist in a common wideband frequency channel. Each transmitter converts information signals into a pulse train which is transmitted in the form of short radio frequency pulses continuously switching from one frequency to another in accordance with a prearranged code or address pattern. The corresponding receiver is synchronously switched to the different pulse frequencies in accordance with the prearranged code or address pattern so that it can receive the radio frequency pulses and detect the pulse train which is reconverted into the information signal.

This invention relates to a wideband radio communication system and in particular to a system in which a plurality of independent communications can coexist in a common wideband frequency channel.

Various techniques have been used to provide a plurality of communications over a common wideband channel. Some known techniques transmit pulses which are coded in time and frequency to provide addressing. The receiver in such systems recognizes only the time-frequency pulse pattern which is its address. These are asynchronous time sharing systems, in which short pulses with relatively long time intervals between them have to be transmitted in order to accommodate many users. Such short pulses require high peak power (high peak to average power ratio) to overcome the noise in the wideband receiver input. Such powerful pulses will cause undue interference to any narrowband system, which may share the frequency spectrum, by exciting and causing ringing in the narrow band tuned circuits.

Another known technique is a pseudo-noise transmission wherein the transmitted radio frequency energy is spread over the whole wideband channel by modulation and coding and thus the receiver must have a wide bandwidth input. Furthermore, the receiver decoding has to be synchronized with the coding of the transmitted signals, and since very short coding pulses are used to spread the energy over the wideband, a very exact and complicated synchronization system is required. The advantage of this technique is that the average density of radiated energy is low, thus it is difficult to detect the transmission in the noise without knowing the code. However, these systems are very sensitive to interference from narrowband systems.

It is, therefore, an object of this invention to provide an improved wideband radio communication system in which a plurality of independent communication signals can coexist in a common wideband channel.

Another object of this invention is to provide a wideband radio communication system wherein interference with narrow band systems operating in the same wideband channel is minimized.

A further object of the invention is to provide a wideband radio communication system wherein other transmissions present in the wideband channel will cause minimum interference with the reception of weak desired signals.

Another object of the invention is to provide a wideband radio communication system having efficient and relatively inconspicuous transmission signals.

A feature of the invention is the provision of a wideband radio communication system wherein information signals are converted to a pulse train and then are transmitted in the form of short radio frequency pulses switching continuously from one frequency to another in accordance with a prearranged code or address pattern, and wherein a receiver is switched synchronously to the different pulse frequencies of a particular code or address pattern in order to receive and detect the pulse train.

Another feature of this invention is the provision of a wideband radio communication system wherein the transmitted pulses are of low power and are infrequently present at any given frequency.

Another feature of the invention is the provision of a wideband radio communication system wherein an information pulse is transmitted as a continuous succession of many short pulses, each on different frequency in accordance with the address code.

Another feature of the invention is the provision of a wideband radio communication system wherein the transmitter continuously transmits energy, thus a high peak to average power ratio is not required.

The invention is illustrated in the drawings wherein.

In practicing the invention, a coded wideband radio communication system is provided using a carrier wave which is frequency modulated by discrete steps. The input signal to the communication system is either in the form of pulses or it is converted to an information pulse train having marks (binary "1") and spaces (binary "0"). For voice input this can be done by either a Delta modulation or PCM process. An address pattern generator provides successively a plurality of different voltage steps (pulses) arranged in two address or code patterns corresponding either to a mark (binary "1") or a space (binary "0"). Each different voltage step will correspond to different frequency in the frequency modulator. The address information pulse train to provide a "1" pattern at the output of the gate when a mark is applied to the gate or a "0" pattern at the output of the gate when a space is applied to the gate. The output of the gate is applied to a carrier frequency oscillator and modulator stage to frequency modulate the carrier frequency wave in accordance with the pattern of voltage pulses. In order to cover the frequency band, the frequency is also changed in large steps after a complete pattern has been transmitted. Thus several consecutive patterns are not transmitted at the same frequencies.

Figure 1:
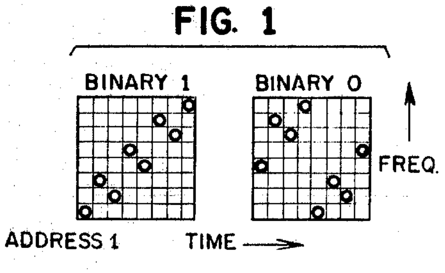
FIG. 1 shows address patterns for a binary "1" and a binary "0"
Figure 2:
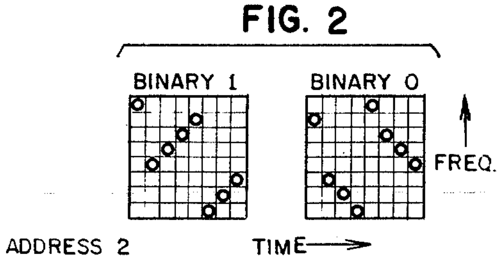
FIG. 2 shows a second set of address patterns for a binary "1" and a binary "0"

In FIG. 1 there is shown frequency patterns for a binary "1" and a binary "0." The patterns shown consist of eight different frequencies with the same eight frequencies being used for both the binary "1" and the binary "0." As can be seen from FIG. 1 the pattern of frequency transmission for a binary "1" and a binary "0" are different with the difference in the patterns being determined by the time at which each of the eight frequencies is transmitted. The patterns are so designed that the same frequency is not present at the same time in each pattern. In FIG. 2 there is shown a binary "1" and a binary "0" pattern for a different address than that shown in FIG. 1.

Figure 3:
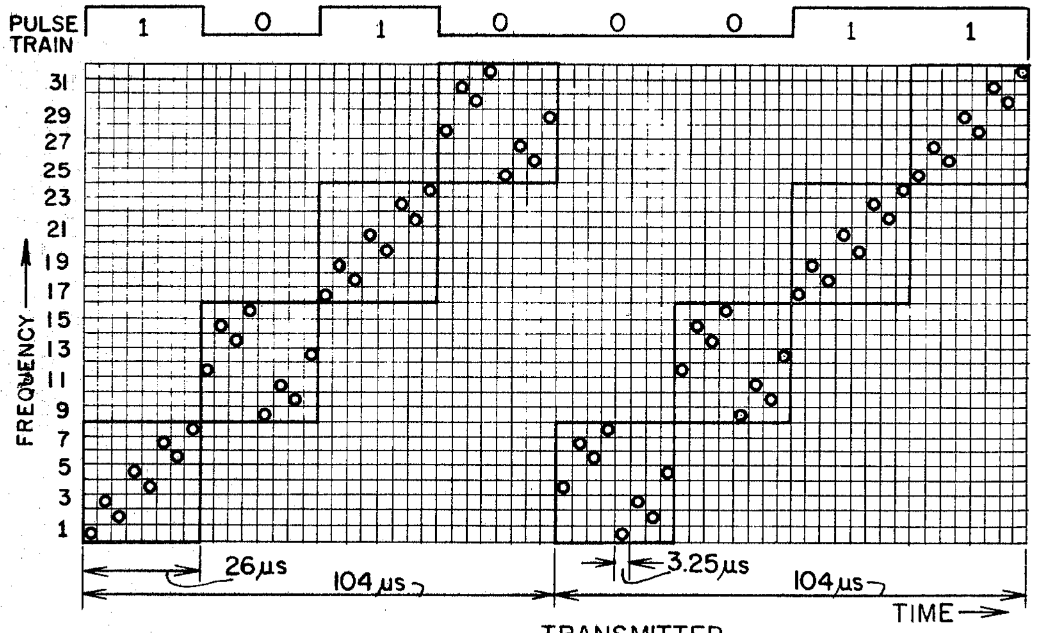
FIG. 3 illustrates the coding arrangement for two successive sweeps of a given pulse train.

FIG. 3 illustrates the frequency pattern for a 10100011 pulse train with the frequency patterns for the binary numbers of the pulse train being selected from the patterns of FIG. 1. The entire frequency spectrum which is to be utilized has been divided into 32 steps which will allow 4 groups of 8 steps each. Thus after the first pattern has transmitted the next pattern is transmitted raised in frequency so as to cover the second group of 8 steps. This is repeated until the entire 32 steps of the frequency spectrum have been covered and then the sweep is repeated.

Figure 4:
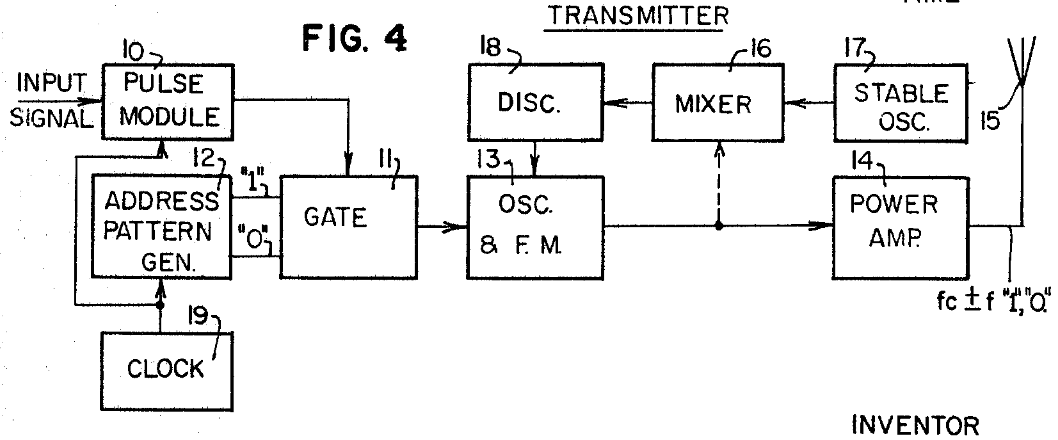
FIG. 4 is a block diagram of a transmitter in accordance with the invention.

In FIG. 4 there is shown a block diagram of a transmitter of a coded wideband radio communication system for frequency spectrum sharing. In this example the system is being utilized for voice communication, however, the system may be used for transmission of any pulse train and is not limited to voice communication.

The transmitter includes a pulse modulator 10, which may be a delta modulator, for producing a train of pulses in response to a voice input signal applied thereto. The timing of these pulses is controlled by clock 19. The output of pulse modulator 10 is connected to a gate 11. This gate has two inputs from address pattern generator 12. Address pattern generator 12, in synchronism with clock 19, produces short voltage pulses having different amplitudes in accordance with a prearranged code or address. Each of the different amplitudes of the voltage pulses corresponds to a different radio frequency in the FM modulator. Generator 12, simultaneously produces two different patterns, one for binary "1," which is applied to the "1" input of gate 11, and another for binary "0," which is applied to the "0" input of gate 11.

The output of gate 11 is connected to oscillator and frequency modulator 13 which oscillates at the carrier frequency. The carrier frequency may be, for example 300 mHz. and is frequency modulated by steps, in a known manner, by the short voltage pulses from address pattern generator 12 which are applied to oscillator and frequency modulator 13 via gate 11. Either the binary "1" pattern or "0" pattern is applied in accordance with the information pulse train from pulse modulator 10 which controls the gate 11. The frequency modulated carrier is applied to a power amplifier 14 and after amplification radiated by antenna 15.

In order to stabilize the transmission frequency a portion of the output of the oscillator and frequency modulator 13 is applied to mixer 16. Mixer 16 is connected to stable oscillator 17 which generates a frequency differing slightly from carrier frequency. This frequency may be 310 mHz. and is mixed, in mixer 16, with the frequency modulated carrier frequency. The output of mixer 16 is the difference between the carrier frequency and the frequency of stable oscillator 17, 10 mHz. plus or minus the frequency steps of the address pattern. This difference frequency is applied to discriminator 18, the zero frequency of which is adjusted to the difference frequency of 10 mHz. Discriminator 18 supplies a DC corrective voltage to the oscillator and frequency modulator 13, which has the address pattern superimposed over it, to shift the frequency modulated carrier counteracting any frequency drift.

Figure 5:
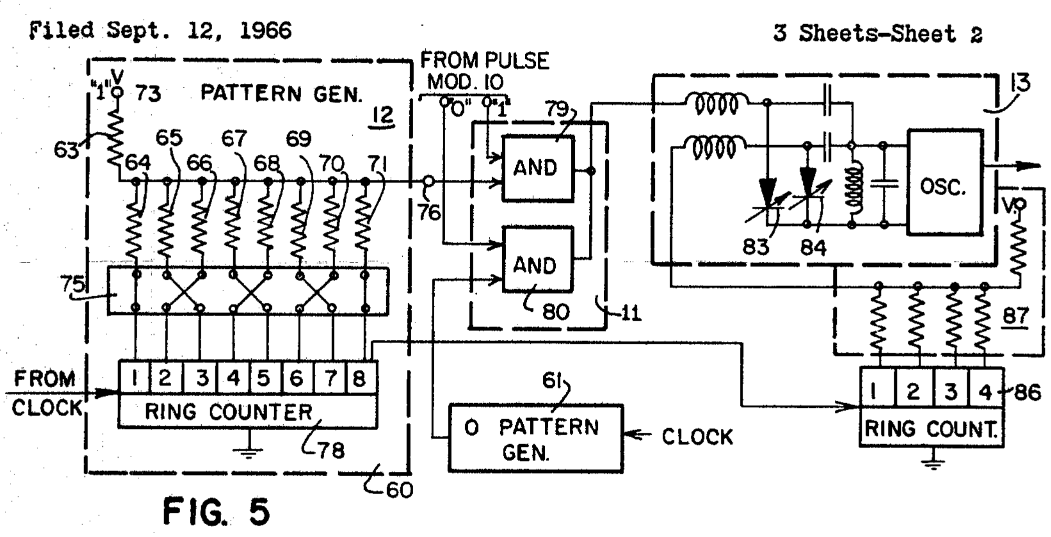
FIG. 5 is a partial schematic and partial block diagram of a frequency pattern generator in accordance with the invention.

In FIG. 5 there is shown pattern generator 12, gate 11 and oscillator and FM generator 13 of FIG. 4. Pattern generator 12 includes a "1" pattern generator 60 and a "0" pattern generator 61. In "1" pattern generator 60 resistors 63 to 71 are connected as a voltage divider between voltage terminals 73 and terminal board 75. Grounding one end of any of the resistors 64 through 71 acts to vary the voltage appearing on line 76. The individual resistors are sequentially coupled to ground through ring counter 78 which counts through eight counts before repeating. The outputs of ring counter 78 are coupled to terminal board 75. Cross connections are made at terminal board 75 to select the desired frequency pattern. The connections shown in FIG. 5 are those of the binary "1" pattern of FIG. 1.

The output from the voltage divider is applied through line 76 to AND gate 79. "0" pattern generator 61 is similar to "1" pattern generator 60 and the voltage from "0" pattern generator 61 is applied to AND gate 80. The outputs from AND gates 79 and 80 are applied to varactor diode 83 of oscillator 13 to vary the frequency of oscillator 13. Inputs to AND gates 79 and 80 from pulse modulator 10 select the particular AND gate which is to be enabled according to the pulse train and thus establish the frequency pattern applied to varactor diode 83.

In addition to pattern generators 60 and 61 a ring counter 86, coupled to a resistor divider 87 is provided. Ring counter 86 receives its input signal from the eighth count of ring counter 78 and thus steps one count for each eight counts of ring counter 78. The direct current voltage output from ring counter 86 is applied to varactor diode 84 to vary the frequency of oscillator 13. The voltage levels produced by the action of ring counter 86 step up the frequency by eight frequency steps for each voltage change thus causing the oscillator sweep to sweep through 32 steps.

Figure 6:
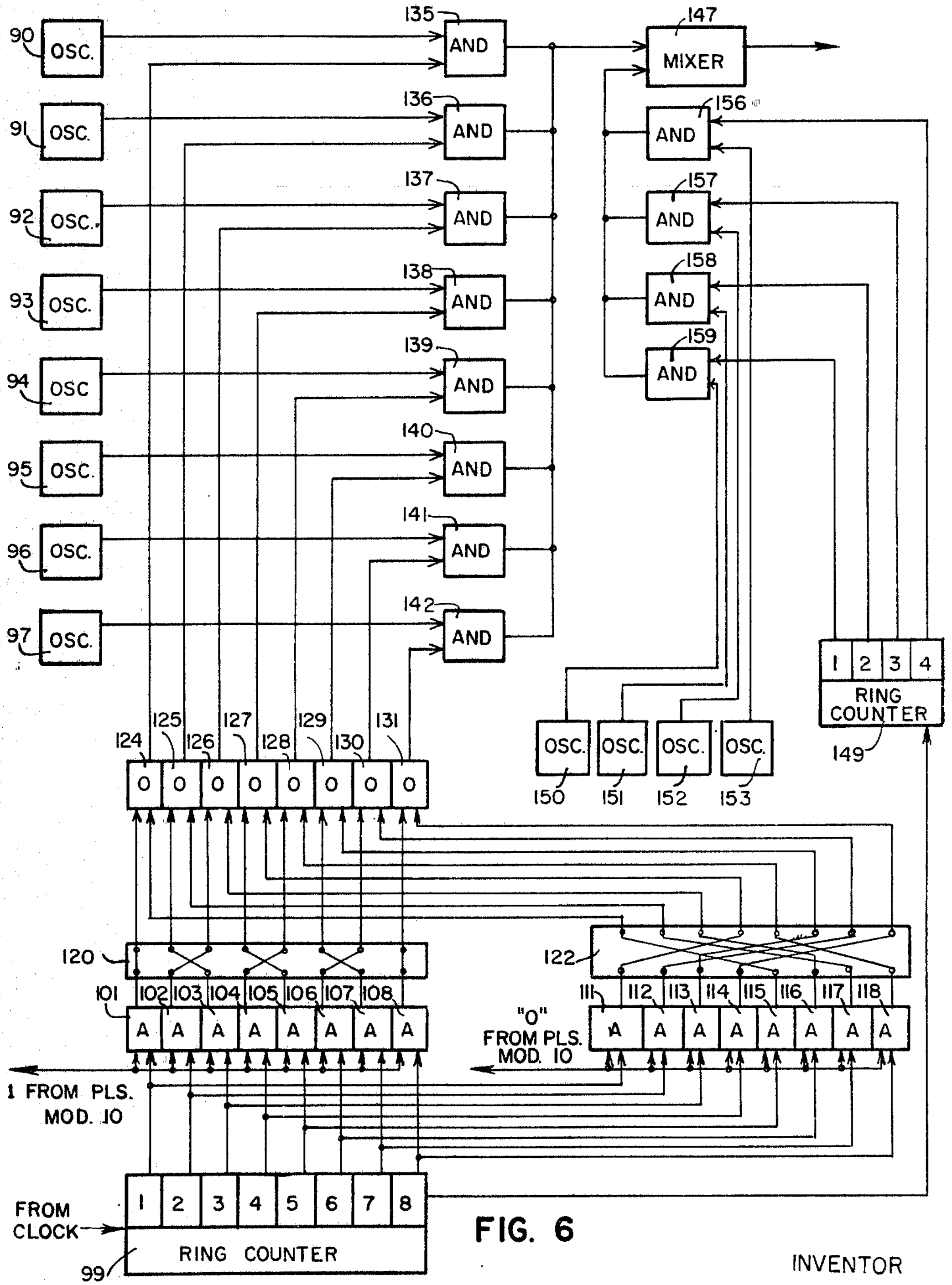
FIG. 6 is a block diagram of a second embodiment of a frequency pattern generator.

In FIG. 6 there is shown a second embodiment of a pattern generator which can be used with this circuit of FIG. 4. In this circuit eight separate stable oscillators 90 to 97 are provided for generating the frequency pattern. A ring counter 99 counts through eight counts to select the desired frequency. The outputs from ring counter 99 are coupled to AND gates 101 to 108 for generating the "1" pattern and to AND gates 111 to 118 for generating the "0" pattern. The outputs of AND gates 101 to 108 are coupled to terminal board 120 and the outputs of AND gates 111 to 118 are coupled to terminal board 122. Interconnections are made at terminal boards 120 and 122 to select the desired frequency patterns. In the example shown the interconnections are for the binary "1" and binary "0" patterns as shown in FIG. 1. AND gates 101 to 108 are enabled by the "1" signal from pulse modulator 10 and AND gates 111 through 118 are enabled by the "0" pulse from modulator 10. Thus only one set of AND gates is enabled at a time.

The outputs of terminal boards 120 and 122 are combined in OR gates 124 to 131 and coupled to AND gates 135 through 142. The outputs from OR gates 124 through 131 enable AND gates 135 through 142 in the sequence determined by the pattern selected. The outputs of oscillators 90 to 97 are coupled to mixer 147 in the predetermined selected pattern.

A second set of four stable oscillators 150 to 153 are provided to sweep the patterns through the entire 32 steps of the frequency spectrum. The outputs of oscillators 150 to 153 are coupled to AND gates 156 to 159. AND gates 156 to 159 are successively enabled by the output of ring counter 149. Ring counter 149 is stepped through four steps receiving its stepping pulse from the eight count of ring counter 99. The selected frequency from oscillators 150 and 153 is coupled to mixer 147 where it is combined with the frequency selected from oscillators 90 to 97. The two frequencies are combined to produce the output frequency. With the pattern generator of FIG. 6 mixer 16, stable oscillator 17 and discriminator 18 of FIG. 4 are not required. Alternatively oscillators 90 to 97 and 150 to 153 can be replaced by one stable, low frequency oscillator. Harmonics selected from the single oscillator replace the outputs of the separate oscillator.

Figure 7:
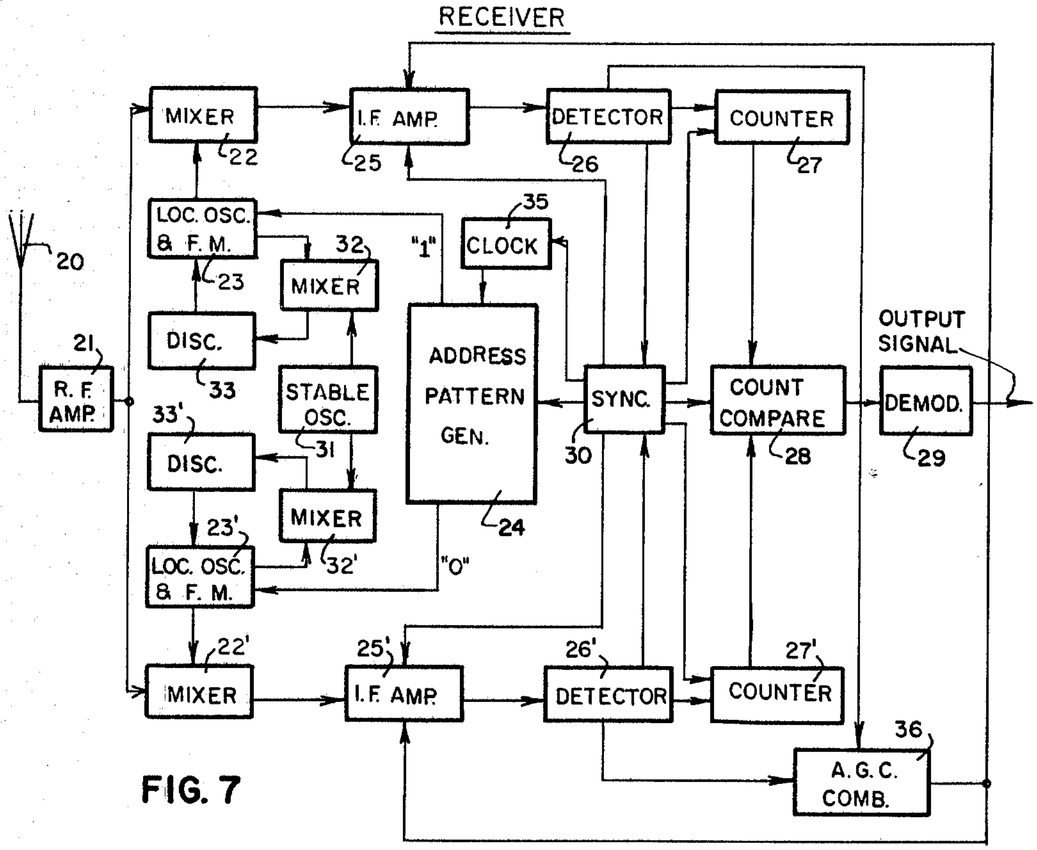
FIG. 7 is a block diagram of a receiver in accordance with the invention.

The receiver shown in FIG. 7 includes an antenna 20 which is connected to a radio frequency amplifier 21. The receiver includes two separate paths, one for processing the address pattern of binary "1" and the other for processing the address pattern of binary "0." Both paths include stages which are identical and these are indicated by the same numbers, with the stages in the "0" path having a prime mark.

Radio frequency amplifier 21 is connected to mixers 22 and 22′. Also connected to mixers 22 and 22′ are local oscillators and frequency modulators 23 and 23′. The frequency of local oscillator 23 is frequency modulated by steps with the address pattern for a binary "1" and the frequency of local oscillator 23′ is frequency modulated by steps with the address pattern for a binary "0." The frequency patterns are supplied from address pattern generator 24 which can be similar to the address pattern generator shown in FIG. 5 or 6.

The frequency of the local oscillator differs from the carrier frequency and may be 285 mHz. so that the mixing of the frequency modulated local oscillator signal and the received carrier signal provides an intermediate frequency signal of 15 mHz. when the received signal is in synchronism with the local oscillator signal. The outputs of mixers 22 and 22′ are coupled to intermediate frequency amplifiers 25 and 25′ respectively. The two patterns are chosen so that the 15 mHz. signal is present in only one of the two paths at the same time. The intermediate frequency signal is detected in detector 26 or 26′, depending upon whether a "1" or a "0" is received, and coupled to counters 27 or 27′ respectively. Counters 27 and 27′ are coupled to count comparator 28 to determine whether a binary "1" or "0" has been transmitted. The output of the count comparator 28 represents an information pulse train which is demodulated in demodulator 29 to provide the voice output signal.

Detectors 26 and 26′ are also connected to synchronizer 30 which provides synchronizing signals for clock 35, counters 27 and 27′, count comparator 28 and address pattern generator 24. Synchronizer 30 also provides "dump" signals for intermediate frequency amplifiers 25 and 25′. The operation of the synchronizer will be described in a subsequent portion of the specification.

The receiver further includes frequency stabilization of the local oscillators and frequency modulators 23 and 23′. A stable oscillator 31 generates a signal having a frequency differing slightly from the local oscillator frequency. For example, this signal may have a frequency of 295 mHz. and is mixed with the local oscillator signal in mixers 32 and 32′. The outputs of mixers 32 and 32′ provide signals having frequencies equal to the difference frequency of the mixed signals and which, in this example, would be 10 mHz. plus or minus the frequency steps of the address pattern. The difference frequency signal is applied to discriminators 33 and 33′, the zero frequencies of which are adjusted to 10 mHz. Each discriminator supplies a DC corrective voltage to the corresponding local oscillator to shift the frequency of the local oscillator to counteract any possible frequency drift. This frequency stabilization is not required if the address pattern generator in accordance with FIG. 6 is used.

In considering the operation of the wideband radio communication system the frequency spectrum sharing will be described first. As already mentioned, the carrier is frequency modulated by steps with short voltage pulses, thus it switches continuously from one frequency to another in accordance with a pre-arranged code or address. In FIGS. 1 and 2 there are shown frequency arrangements for two different addresses, each having a separate code for the "1" and "0." Each address is associated with one transmission link and is used at the transmitter and receiver concerned. It is obvious that a plurality of different patterns can be arranged and that the pattern is not necessarily an eight pulse frequency pattern, but can have any arbitrary number of different pulse frequencies.

In order to minimize interference with narrowband systems, the number of frequency steps should be selected so that the number of pulses per second at any radio frequency should correspond to a tone either above or below the voice audio band, in order that the interference will not be audible if it occurs. In addition the energy spectrum of the wideband system should have a small and uniform density over the entire frequency band used by the system. Therefore, the pulse length of the address pattern and the frequency steps should be so selected that the pulse spectrum of one pulse partially overlaps the spectrum of another pulse on the adjacent frequency which means that the difference in frequency between each step should be about equal to the inverse of pulse length.

The coded wideband radio communication system can be designed, for example, for an available frequency bandwidth of 10 mHz. Assuming Delta modulation with a sampling rate of 38.4 kHz., each information pulse will be 26 microseconds long. Assuming 8 address pulses per information pulse a pulse length of 3.25 microseconds is shown for the code patterns of FIGS. 1, 2 and 3. Further assuming 32 frequency steps divided into 4 address patterns, the 10 megacycle spectrum is swept approximately 9,600 times per second so that each frequency step in spectrum will receive energy 9,600 times per second. Thus the interference to a narrowband receiver, if any, will be well above voice frequencies. Since each pulse has a length of 3.25 microseconds, and there are 32 frequency steps, the sweep period is 104 microseconds. Each frequency step is equal to 10 mHz. divided by 32 steps or approximately 312 kHz. which is about the inverse of 3.25 microseconds.

In FIG. 3 there are shown two successive sweeps for the information pulse train shown at the top of the figure. The address pattern requires eight pulses for each pulse of the modulation train and the pattern is shifted in frequency four times during one sweep so that every frequency step is used once and only once during each sweep.

For the operation of the wideband radio communication system, address pattern generator 12 generates 32 voltage pulses which correspond to 32 frequency steps spaced 312 kilocycles apart. These frequency steps are available in groups of eight corresponding to the two patterns at the output, and represent "1" and "0." The patterns shift successively 8 frequency steps four times during each sweep, so that all 32 frequency steps are used. Thus the whole bandwidth of 10 megacycles is covered uniformly by the transmission.

In the receiver the carrier signal, modulated by the frequency steps corresponding to the address pattern, is mixed with the local oscillator signal which is also frequency modulated with the pulse frequency steps corresponding to the address pattern. When the address pattern of the received carrier is identical and synchronized with the address pattern generated in the receiver, the resultant intermediate frequency signal is contant and of a predetermined frequency which passes the input filter of the intermediate frequency amplifier. When the address pattern for "1" is received it corresponds to theh "1" address pattern from the address pattern generator 24 so that each frequency step is converted to the same IF frequency and intermediate frequency amplifier 25 responds to the constant output frequency of mixer 22. When the received address pattern does not correspond with the "1" address pattern from generator 24, the output of mixer 22 produces different frequencies which are not constant and to which intermediate frequency amplifier 25 is not responsive. When the pattern for "0" is received the "0" path responds in the same manner and a constant intermediate frequency signal is produced to which intermediate frequency amplifier 25′ is responsive. When responsive, the intermediate frequency amplifier 25 and 25′ provide a pulse output signal in the form of a constant frequency wave of a certain length to detectors 26 and 26′ and then to counters 27 and 27′. The correspondence between the receiver generated frequency patterns and the received frequency patterns does not require that the frequencies be equal but only that the frequencies are changed by the same amount each time a frequency shift occurs.

Assuming that the received signal is a "1," then eight pulses are applied from the intermediate frequency amplifier 25 to the counter 27. Counter 27 provides an output voltage proportional to the count of the received pulses. At the end of the eight pulse address period this output voltage is applied to the count comparator 28 and compared with the voltage at the output of counter 27'. If the voltage of counter 27 exceeds the voltage of counter 27' a "1" is applied to the demodulator 29. The reverse action happens when a "0" is received. In this case counter 27' provides a large voltage output whereas counter 27 provides no output. As long as no interference occurs either counter 27 or counter 27' provides a full voltage output which causes either a "1" or "0" output respectively from count comparator 28. Thus the information pulse train is produced and which, after demodulation, provides the transmitted information.

However, if strong narrow band signals interfere with certain pulse frequency steps, these narrowband signals can be available at the receiver input during the whole sweep period or even longer. Because these interference signals are present at both mixers 22 and 22' simultaneously during the whole sweep period, both counters 27 and 27' will count one for each frequency step which has the interference signal on it, regardless of whether a "1" or a "0" was transmitted. For better understanding an example is given considering the pattern of FIG. 2. Assume that interference occurs on frequencies 3, 5 and 6 and the "1" pattern is received by the receiver. Counter 27 counts all eight pulses and counter 27' counts three pulses, because of the interference signals. Both counters apply the output voltages to count comparator 28. One of these voltages may be positive and the other negative to make comparison more easy. Since count comparator 28 is responsive to the higher of the two voltage levels and voltage corresponding to count 8 is higher than the one corresponding to count 3, "1" will be applied to demodulator 29. Even if seven out of eight frequency steps are interfered with, the counters 27 and 27' will show a ratio of voltages of 8:7 and a correct digit will be sent to the demodulator.

Infrequently the interference signal may be of about equal amplitude and opposite phase to the received signal so that the cancellation of the desired pulse occurs. Assume that three interfering signal cancellations occur in intermediate frequency amplifier 25 only and not in intermediate frequency amplifier 25'. Even in this case the count would be 5:3 instead of 8:3 and a correct digit will be sent to demodulator 29. As can be seen, the system according to the invention is highly insensitive to interference from narrow band systems and will provide reliable and error free transmission of information.

For synchronizing the receiver with the transmitter, clock 35 in the receiver runs slightly slower or faster than clock 19 in the transmitter, so that the two patterns shift relative to each other. When they are in coincidence clock 35 is locked to clock 19 by synchronizer 30. Synchronizer 30 is responsive to the pulse signals available at either detector 26 or detector 26' and provides a timing signal for clock 35 to synchronize it with the transmitter clock. Further synchronizer 30 provides two separate timing signals each to counters 27 and 27', one timing signal causes counters 27 and 27' to count one count at the end of each pulse period if a sufficiently strong pulse was received. The second timing signal resets counters 27 and 27' to zero after each address pattern is received. Synchronizer 30 also provides a timing signal to count comparator 28 at the end of each address pattern to cause it to compare the counts (voltages) in counters 27 and 27' and to send "1" or "0" to demodulator 29 depending on which count is higher. This happens just before the counters 27 and 27' are reset to zero. Finally the synchronizer 30 provides a "dump" signal to intermediate frequency amplifiers 25 and 25' at the end of each pulse period. A "dump" signal momentarily shorts the intermediate frequency amplifiers so that any signal energy accumulated during the pulse period in intermediate frequency amplifiers 25 and 25' and/or detectors 26 and 26' is dissipated. This is necessary so that a large amount of energy, which may be accumulated from a strong interference during one pulse, will not influence the detection and count during the subsequent pulse.

Also shown in FIG. 7 is the usual automatic gain control system (AGC) wherein voltages derived from detectors 26 and 26' are coupled to AGC combiner 36. The output of AGC combiner 36 is an AGC signal which is applied to intermediate frequency amplifiers 25 and 25'. The AGC can be so adjusted that when no signal is received, the average count caused by noise alone is 3 or 4 (slightly less than half), to obtain the best sensitivity of the system. Then as the signal is received the intermediate frequency amplifier gain will be decreased but the average count will remain 4 (or more if interference is present). With a strong signal input without interference, one of the two counters will show 8, while the other shows 0, making the average 4, but the interference may increase this average slightly.

Security provisions can be easily included because digital transmission is utilized. A pulse scrambling cryptic unit can be connected between pulse modulator 10 and gate 11 at the transmitter and between count comparator 28 and demodulator 29 at the receiver. Accordingly, no changes in the system itself is required when security provisions are added.

The advantage of the system according to the invention is an efficient, addressed transmission of voice or digital signals with good dynamic range in comparison to other wideband systems. There is less interference between this system and narrowband systems in the same channels thus, providing better spectrum utilization. Receiver synchronization is less critical than a pesudo-noise system because the clock rate is an order of magnitude or more slower than the clock rate of a pseudo-noise system with a comparable bandwidth. Because of coding redundancy and detection by counting, very strong undesirable transmission on fixed frequencies, or transmission from other transmitters operating in accordance with the system of the invention, will not prevent the reception of weak signals addressed to a particular station.

I claim:

1. A wideband communications system in which information is transmitted in the form of emission of radio energy at different discrete frequencies, including in combination, first coding means adapted to receive an information signal and to generate a first coding signal in response thereto, means for generating a carrier signal having a plurality of discrete frequencies coupled to said first coding means, said carrier generation means being responsive to said first coding signal to generate sequentially said plurality of discrete frequencies according to a first frequency pattern determined by said first coding signal, transmitter means coupled to said carrier generating means for transmitting said carrier signal, receiver means for receiving said carrier signal, second coding means for generating a second coding signal, comparing means coupled to said receiver means and said second coding means and being responsive to said second coding signal to develop a receiver signal having a second frequency pattern, said comparing means further being responsive to a correspondence between said first frequency pattern of said received carrier signal and said second frequency pattern of said receiver signal to develop correspondence signals, counter means coupled to said comparing means for receiving and counting said correspondence signals and to produce an output signal in response to a count above a predetermined number.

2. The wideband communication system of claim 1 wherein all of said plurality of discrete frequencies are used before any of said plurality of discrete frequencies is repeated and said plurality of discrete frequencies are divided into a plurality of frequency groups, each of said frequency groups having an equal number of said plurality of discrete frequencies with said frequencies in each frequency group being consecutive, said first coding means including code pattern generation means adapted to receive said information signal and being responsive thereto to generate a frequency pattern code signal and a frequency group code signal, said carrier generation means being responsive to said frequency group code signal to generate a selected one of said frequency groups, said carrier generation means further being responsive to said frequency pattern code signal to generate the frequencies within said selected one of said frequency groups according to a particular pattern.

3. The wideband communications system according to claim 1 wherein said carrier signal generation means includes an oscillator having voltage responsive tuning means, said first coding means includes means for generating said first coding signal in the form of a plurality of voltage steps of different amplitudes, and circuit means coupling said first coding signal generating means to said voltage responsive tuning means for varying the frequency of said oscillator in accordance with the pattern of said voltage steps.

4. The wideband communication system according to claim 1 wherein said carrier signal generation means includes a plurality of oscillator means, and said first coding means includes gating means responsive to said first coding signal for sequentially gating said plurality of oscillator means to said transmitter means to thereby form said first frequency pattern.

5. The wideband communications system of claim 1 in which said information signal is in the form of a sequence of binary "1's" and binary "0's," and first coding means including a first binary "1" code signal generator and a first binary "0" code signal generator for generating first binary "1" and binary "0" code signals respectively and gate means coupling said binary "1" and binary "0" code signal generators to said carrier signal generation means, said gate means being adapted to receive said information signal and being responsive thereto to select sequentially said first binary "1" and first binary "0" code signals and apply the same to said carrier signal generation means, said carrier signal generation means being responsive to said first binary "1" and binary "0" code signals applied thereto to develop a carrier signal having a frequency pattern in accordance with said information signal.

6. The wideband communications system of claim 5 wherein said second coding means includes a second binary "1" code signal generator and a second binary "0" code signal generator for generating second binary "1" and binary "0" code signals respectively, said comparing means including receiver signal generator means coupled to said second binary "1" and binary "0" coding signal generators, said receiver signal generator means being responsive to said second binary "1" and binary "0" coding signals to develop first and second receiver signals having frequency patterns in accordance with said second binary "1" and binary "0" coding signals respectively, said comparing means further including first circuit means coupled to said receiver means and said receiver signal generator means and being responsive to a correspondence between the frequency pattern of said received carrier signal and said first receiver signal to develop a first correspondence signal, said comparing means further including second circuit means coupled to said receiver means and said receiver signal generator means and being responsive to a correspondence between the frequency pattern of said received carrier signal and said second receiver signal to develop a second correspondence signal, first counter means coupled to said first circuit means for counting said first correspondence signals and second counter means coupled to said second circuit means for counting said second correspondence signals, and count comparing means coupled to said first and second counting means for producing a binary output signal in accordance with the counts therein.

7. The wideband communications system of claim 6 wherein said first circuit means includes, first mixer means coupled to said receiver means and said receiver signal generation means for mixing said received carrier signal and said first receiver signal to develop a first intermediate frequency signal, first intermediate frequency filter means coupling said first mixer means to said first counter means, said first intermediate frequency filter means being responsive to said first intermediate frequency signal of a particular frequency to develop said first correspondence signal, second mixer means coupled to said receiver means and said receiver signal generation means for mixing said receiver carrier signal and said second receiver signal to develop a second intermediate frequency signal, second intermediate frequency filter means coupling said second mixer means to said second counter means, said second intermediate frequency filter means being responsive to said second intermediate signal of said particular frequency to develop said second correspondence signal.

8. A wideband communication system in which an information signal is transmitted in the form of the emission of radio energy at different discrete frequencies, including in combination, gate means adapted to receive the information signal, said information signal being in the form of a sequence of binary "1's" and binary "0's," generating means for developing a signal having a plurality of discrete frequencies coupled to said gate means, a binary "1" code signal generator and a binary "0" code signal generator coupled to said gate means and acting to generate binary "1" and binary "0" code signals respectively, said gate means being responsive to said information signal to select sequentially said binary "1" and binary "0" code signals and to apply the same to said generating means, said generating means being responsive to each said binary "1" code signal applied thereto to develop a first pattern of separate and distinct single frequencies in accordance therewith, said generating means being responsive to each binary "0" code signal to develop a second pattern of separate and distinct signal frequencies which is different from said first pattern, and transmitter means coupled to said generating means for transmitting said frequency patterns.

9. A wideband communications system in which information is transmitted by the emission of radio energy at different discrete frequencies in the form of a carrier signal having a frequency pattern in accordance with the information to be transmitted, including in combination, receiver means for receiving said carrier signal, a binary "1" code signal generator and a binary "0" code signal generator for generating binary "1" and binary "0" code signals respectively, receiver signal generator means coupled to said binary "1" and binary "0" code signal generators, said receiver signal generator means being responsive to said binary "1" and binary "0" code signals to develop first and second receiver signals having frequency patterns in accordance with said binary "1" and binary "0" coding signals respectively, first comparing means coupled to said receiver means and said receiver signal generator means and being responsive to a correspondence between the frequency patterns of said received carrier signal and said first receiver signal to develop a first correspondence signal, second comparing means coupled to said receiver means and said receiver signal generator means and being responsive to a correspondence between frequency pattern of said received carrier signal and said second receiver signal to develop a second correspondence signal, first counter means coupled to said first comparing means for counting said first correspondence signals and second counter means coupled to said second circuit means for counting said second correspondence signals, and count comparing means coupled to said first and second counting means for producing a binary output signal in accordance with the counts therein.

10. A method of coded wideband communication in which an information signal is transmitted in the form of emission of radio energy on different discrete frequencies, including the steps of;

(a) dividing the frequency band used by the system into a plurality of frequency steps, (b) shifting from one frequency step to another at time intervals in accordance with a prearranged code to form said information signal, said code being so arranged that all of said plurality of frequency steps are used before any one of said frequency steps is repeated, said time intervals being selected to be approximately equal to the inverse of said frequency steps whereby said frequency band is uniformly covered by the emitted radio energy, and (c) transmitting said information signal.

11. The method of wideband communication according to claim 10 and further including the step of frequency modulating a continuous carrier wave by steps over the frequency band used by the system.

12. The method of coded wideband communication according to claim 10 further including the steps of;

(a) dividing said prearranged code into a first code corresponding to a digital mark of said transmitted information signal and a second code corresponding to a digital space of said transmitted information signal.

(b) dividing said pluarlity of frequency steps into groups with each of said first and second codes and said groups having the same number of frequency steps, (c) selecting said frequency steps in each of said groups in accordance with one of said first and second code groups, and (d) transmitting said groups sequentially until all of said plurality of frequency steps are used before any one of said frequency steps is repeated.

13. The method of wideband communication according to claim 12 and further including the steps of;

(a) receiving said transmitted signal, (b) generating first and second local signals having prearranged codes corresponding to said first and second codes respectively, (c) separately comparing said received signal with said first and second local signal to produce first and second output pulses respectively upon frequency correspondence therebetween, (d) separately counting said first and second output pulses, and (e) producing a digital mark signal with the number of said first output pulses exceeding said second output pulses and a digital space signal with the number of said second output pulses exceeding said first output pulses.

References Cited

UNITED STATES PATENTS 3,233,221 2/1966 Perlin et al. ---------- 340—147

DONALD J. YUSKO, Primary Examiner

U.S. Cl. X.R.

325—55